United States Patent
Rizi et al.

(10) Patent No.: US 12,499,135 B2
(45) Date of Patent: Dec. 16, 2025

(54) COMPUTER SYSTEMS AND METHODS FOR IDENTIFYING LOCATION ENTITIES AND GENERATING A LOCATION ENTITY DATA TAXONOMY

(71) Applicant: Procore Technologies, Inc., Carpinteria, CA (US)

(72) Inventors: Azadeh Yazdan Panah Gohar Rizi, Richmond Hill (CA); Matt Man, Thornhill (CA); Taylor Wasser, Toronto (CA); Julian Clayton, Milford, CT (US)

(73) Assignee: Procore Technologies, Inc., Carpinteria, CA (US)

( * ) Notice: Subject to any disclaimer, the term of this patent is extended or adjusted under 35 U.S.C. 154(b) by 544 days.

(21) Appl. No.: 17/957,501

(22) Filed: Sep. 30, 2022

(65) Prior Publication Data
US 2024/0111792 A1 Apr. 4, 2024

(51) Int. Cl.
*G06F 16/29* (2019.01)
*G06V 10/82* (2022.01)
(Continued)

(52) U.S. Cl.
CPC ............ *G06F 16/29* (2019.01); *G06V 10/82* (2022.01); *G06V 30/14* (2022.01);
(Continued)

(58) Field of Classification Search
CPC ........ G06F 16/29; G06V 30/14; G06V 30/30; G06V 10/82; G06V 20/20; G06V 30/1456;
(Continued)

(56) References Cited

U.S. PATENT DOCUMENTS

| 10,984,780 B2 * | 4/2021 | Bellegarda | G06N 7/01 |
| 2018/0068482 A1 * | 3/2018 | Yam | G06T 13/80 |

(Continued)

FOREIGN PATENT DOCUMENTS

| JP | 2015007955 A | * | 1/2015 |
| JP | 2017-037457 A | | 2/2017 |

(Continued)

OTHER PUBLICATIONS

International Searching Authority, PCT International Search Report and Written Opinion, PCT International Application No. PCT/US2023/075288, dated Jan. 29, 2024, 9 pages.

(Continued)

*Primary Examiner* — Amandeep Saini
*Assistant Examiner* — Daniella M. DiGuglielmo
(74) *Attorney, Agent, or Firm* — Lee Sullivan Shea & Smith LLP

(57) ABSTRACT

An example computing platform is configured to: obtain a two-dimensional drawing of a portion of a construction project; perform an image processing analysis of the two-dimensional drawing to identify one or more location entities within the two-dimensional drawing; derive embeddings for each location entity in the two-dimensional drawing; based on the derived embeddings, determine relationships between the one or more location entities; and based on the determined relationships between the one or more location entities, generate a location entity data taxonomy that includes each identified location entity as a respective node that is related to at least one other location entity.

20 Claims, 8 Drawing Sheets

(51) Int. Cl.
    *G06V 20/20*     (2022.01)
    *G06V 30/14*     (2022.01)
    *G06V 30/146*     (2022.01)
    *G06V 30/18*     (2022.01)
    *G06V 30/19*     (2022.01)
    *G06V 30/30*     (2022.01)
    *G06V 30/422*     (2022.01)

(52) U.S. Cl.
    CPC ........ *G06V 30/1456* (2022.01); *G06V 30/147* (2022.01); *G06V 30/18181* (2022.01); *G06V 30/19153* (2022.01); *G06V 30/30* (2022.01); *G06V 30/422* (2022.01); *G06V 20/20* (2022.01)

(58) Field of Classification Search
    CPC .......... G06V 30/147; G06V 30/18181; G06V 30/19153; G06V 30/422
    See application file for complete search history.

(56) References Cited

U.S. PATENT DOCUMENTS

2021/0064858 A1*   3/2021   Batra ...................... G06N 3/08
2021/0073449 A1*   3/2021   Segev .................... G06F 30/27

FOREIGN PATENT DOCUMENTS

KR     10-2104605 B1     4/2020
WO     2022-075634 A1     4/2022

OTHER PUBLICATIONS

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

Devlin, Jacob et al., "BERT: Pre-Training of Deep Bidirectional Transformers for Language Understanding", arXiv:1810.04805v2 [cs.CL] May 24, 2019, 16 pages.

Redmon, Joseph et al., "You Only Look Once: Unified, Real-Time Object Detection", In Proceedings of the IEEE conference on computer vision and pattern recognition, 2016, pp. 779-788.

* cited by examiner

COMPUTER SYSTEMS AND METHODS FOR IDENTIFYING LOCATION ENTITIES AND GENERATING A LOCATION ENTITY DATA TAXONOMY

BACKGROUND

Construction projects are complex undertakings that involve intensive planning, design, and implementation throughout several discrete construction phases. Construction planning, design, and implementation produces a vast amount of information related to a construction project which is then utilized by many different construction professionals in many different ways throughout the lifecycle of the construction project. In order to alleviate some of the burden involved with handling such vast amounts of information, software technology has been developed to enable electronic management of information associated with a construction project.

OVERVIEW

As mentioned above, software technology has been developed to enable computing platforms to ingest and store information associated with construction projects in an effort to facilitate electronic management of construction project information. However, the construction industry as a whole remains susceptible to various inefficiencies related to processing this vast amount of information. Frequently, these inefficiencies stem from the siloed structure of construction project information, which typically lacks any unifying characteristic that can serve as a common denominator to provide meaningful connectivity between that information.

To address these and other inefficiencies, Procore Technologies, Inc., who is the assignee of the present application, has been developing new software technology that enables more intelligent ingestion and processing of construction project information. For example, Procore Technologies has developed software technology that utilizes machine-learning models to ingest new data that is generated throughout the planning, design, and implementation processes of a construction project and associate that data with physical locations within the construction project. By using location as a unifier for all types of construction project data in this way, relationships between data assets can be established and used to create a construction knowledge graph that reflects the connectivity between many different types of data assets. More information about improving data connectivity through location characteristics can be found in U.S. application Ser. No. 17/307,869, filed on May 4, 2021, and titled "Construction Knowledge Graph," which is herein incorporated by reference in its entirety.

Procore Technologies has continued to explore improvements related to data connectivity. Disclosed herein is new software technology that improves upon existing technology for identifying connections and relationships for information associated with construction projects. At a high level, the disclosed software technology involves identifying location entities associated with a construction project, determining interrelationships between those location entities, and generating a data taxonomy (e.g., a hierarchical taxonomy) that organizes and presents those location entities and interrelationships.

More particularly, the disclosed software technology involves utilizing one or more machine-learning models to identify, from a set of one or more drawings (e.g., two-dimensional drawings) for a construction project, location entities within the construction project. In this regard, a location entity may refer to a defined area within a construction project that is associated with a particular location, which may or may not be demarcated by physical boundaries. Some examples of location entities that may be demarcated by physical boundaries (e.g., walls, floors, ceilings, etc.) may include buildings, floors within a building, rooms within a floor of a building, hallways, elevators, or staircases, among other possibilities. Some examples of location entities that may not be demarcated by physical boundaries may include laydown areas for temporary storage of construction materials or equipment, or stabilized construction ingress and egress points for a construction site.

The disclosed software technology may further involve determining relationships between identified location entities. For instance, the disclosed technology may determine that certain location entities have a hierarchical relationship with one or more other location entities. For example, a given room location entity may be related as a sub-area of a given wing location entity, which may be related as a sub-area of a given floor location entity, which may be related as a sub-area of a given building location entity, and so on. In some implementations, the disclosed software technology may involve mapping the locations of location entities across different location planes. In this regard, a "location plane" may refer to one of the numerous different bases that may be used to define the same location within a construction project. Some examples of different location planes may include a pixel-based location plane that defines the location of a given location entity with respect to the pixels on a 2D drawing, a three-dimensional coordinate system that may define the given location with respect to a virtual coordinate system within a three-dimensional drawing file (e.g., a Building Information Model (BIM) file), a global positioning system (GPS)-based location plane that may define the given location in terms of latitude, longitude, and elevation, a project-specific reference system that may define the given location with respect to a specific project feature (e.g., construction project gridlines, construction project area names (e.g., Level 01 Lobby, Level 01 Reception Area, etc.)), among various other possibilities.

Further, in some implementations, certain location entities may be associated with different locations during different phases of a construction project, and in such instances, the disclosed software technology may involve tracking those location entities throughout the lifecycle of the construction project.

The disclosed software technology may further involve generating a data taxonomy (e.g., a graph, a tree, etc.) that can be used to organize and present information about identified location entities in an intelligent way that visualizes the determined relationships between those location entities. In some implementations, the generated data structure may be interactive such that a construction professional may provide user input to select nodes representing location entities to obtain respective information about those location entities (which may include location plane mapping information as described above) and their hierarchical relationships.

Accordingly, in one aspect, disclosed herein is a method carried out by a computing platform that involves: (i) obtaining a two-dimensional drawing of a portion of a construction project; (ii) performing an image processing analysis of the two-dimensional drawing to identify one or more location entities within the two-dimensional drawing; (iii) deriving embeddings for each location entity in the two-dimensional drawing; (iv) based on the derived embeddings, determining relationships between the one or more location entities; and (v) based on the determined relationships between the one or more location entities, generating a location entity data taxonomy that includes each identified location entity as a respective node that is related to at least one other location entity.

In another aspect, disclosed herein is a computing platform comprising at least one network interface, at least one processor, at least one non-transitory computer-readable medium, and program instructions stored on the at least one non-transitory computer-readable medium that are executable by the at least one processors such that the computing platform is configured to carry out the functions disclosed here, including but not limited to the functions of the foregoing method.

In yet another aspect, disclosed herein is at least one non-transitory computer-readable storage medium that is provisioned with program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

Figure 1:
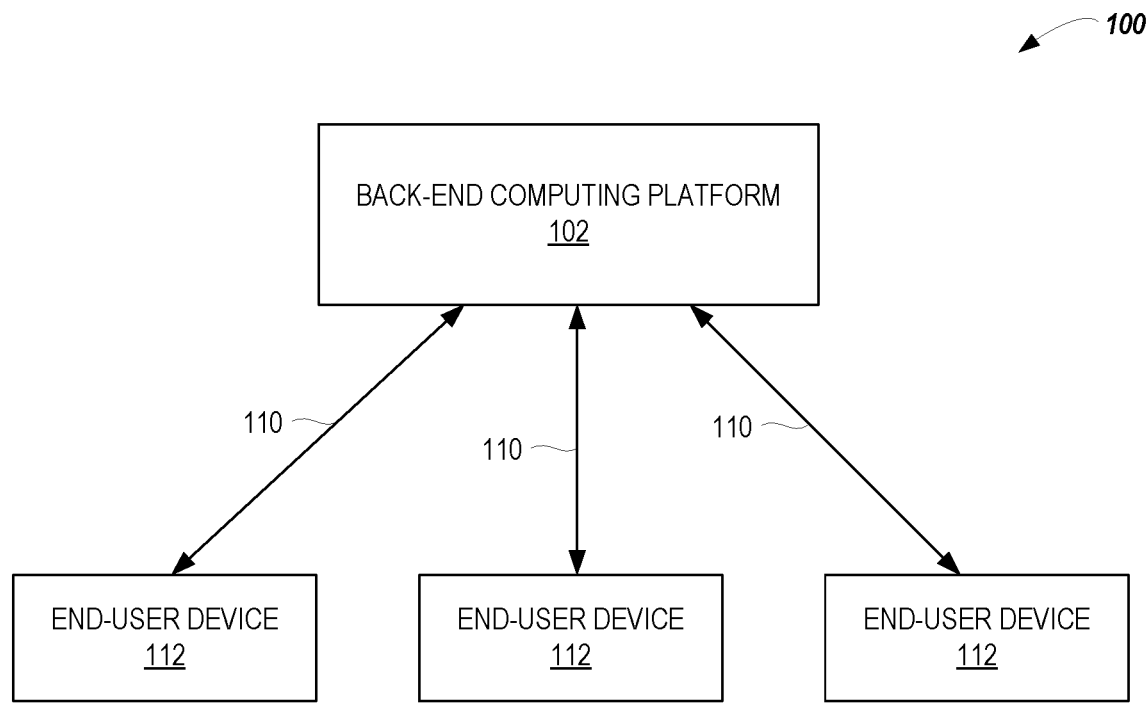
FIG. 1 depicts an example network configuration in which example embodiments disclosed herein may be implemented.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

As one possible implementation, this software technology may include both front-end software running on one or more end-user devices that are accessible to users of the software technology and back-end software running on a back-end computing platform (sometimes referred to as a "cloud" platform or a "data" platform) that interacts with and/or drives the front-end software, and which may be operated (either directly or indirectly) by a provider of the front-end client software (e.g., Procore Technologies, Inc.). As another possible implementation, this software technology may include front-end client software that runs on end-user devices without interaction with a back-end platform (e.g., a native software application, a mobile application, etc.). The software technology disclosed herein may take other forms as well.

Turning now to the figures, FIG. 1 depicts an example network configuration 100 in which example embodiments of the present disclosure may be implemented. As shown in FIG. 1, the network configuration 100 includes an example back-end computing platform 102 that may be communicatively coupled to one or more client stations, depicted here, for the sake of discussion, as three end-user devices 112.

In practice, the back-end computing platform 102 may generally comprise some set of physical computing resources (e.g., processors, data storage, communication interfaces, etc.) that are utilized to implement the new software technology discussed herein. This set of physical computing resources take any of various forms. As one possibility, the back-end computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the back-end computing platform 102 may comprise "on-premises" computing resources of the organization that operates the back-end computing platform 102 (e.g., organization-owned servers). As yet another possibility, the back-end computing platform 102 may comprise a combination of cloud computing resources and on-premises computing resources. Other implementations of the example computing platform 102 are possible as well.

As yet another possibility, the back-end computing platform 102 may comprise one or more dedicated servers that have been provisioned with software for carrying out one or more of the computing platform functions disclosed herein, including but not limited to functions related to identifying location entities, determining interrelationships between location entities and/or relationships between location entities and construction projects, generating data structures that can be used to organize information about identified location entities and their associated relationships, or causing the information about identified location entities and their associated relationships to be presented by the one or more end-user devices 112. The one or more computing systems of the back-end computing platform 102 may take various forms and be arranged in various manners.

In turn, end-user devices 112 may take any of various forms, examples of which may include a desktop computer, a laptop, a netbook, a tablet, a smartphone, and/or a personal digital assistant (PDA), among other possibilities.

As further depicted in FIG. 1, the back-end computing platform 102 may be configured to communicate with the end-user devices 112 over respective communication paths 110. Each communication path 110 between the back-end computing platform 102 and an end-user device 112 may generally comprise one or more communication networks and/or communications links, which may take any of various forms. For instance, each respective communication path with the back-end computing platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with the back-end computing platform 102 may be wireless, wired, or some combination thereof, and may carry data according to any of various different communication protocols. Although not shown, the respective communication paths with the back-end computing platform 102 may also include one or more intermediate systems. For example, it is possible that the back-end computing platform 102 may communicate with a given end-user device 112 via one or more intermediary systems, such as a host server (not shown). Many other configurations are also possible.

Although not shown in FIG. 1, the back-end computing platform 102 may also be configured to receive data from one or more external data sources that may be used to facilitate functions related to the processes disclosed herein. For example, the back-end computing platform 102 may be configured to receive two-dimensional drawings and/or information about location entities from external data sources and determine location entity interrelationships for them and generate data structures representing those location entities and interrelationships.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE COMPUTING DEVICES

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

Figure 2:
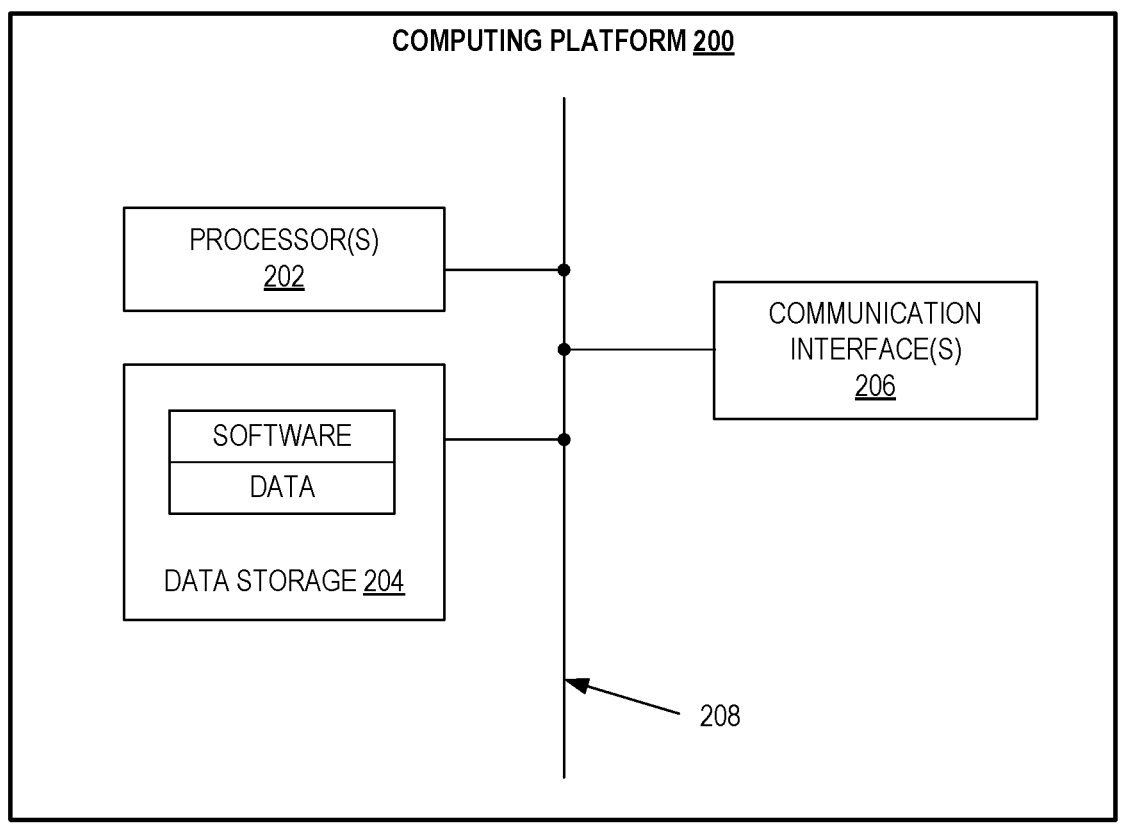
FIG. 2 depicts a structural diagram of an example computing platform that may be configured to carry out one or more functions in accordance with the disclosed technology.

FIG. 2 is a simplified block diagram illustrating some structural components that may be included in an example computing platform 200. The example computing platform 200 could serve as, for instance, the back-end computing platform 102 of FIG. 1 that may be configured to create and/or run the disclosed data science models for identifying location entities and determining relationships associated with those location entities. In line with the discussion above, the computing platform 200 may generally comprise one or more computer systems (e.g., one or more servers), and these one or more computer systems may collectively include at least one or more processors 202, a data storage 204, and one or more communication interfaces 206, all of which may be communicatively linked by a communication link 208 that may take the form of a system bus, a communication network such as a public, private, or hybrid cloud, or some other connection mechanism.

The one or more processors 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that the one or more processors 202 could comprise processing components that are distributed across a plurality of physical computing resources connected via a network, such as a computing cluster of a public, private, or hybrid cloud.

In turn, the data storage 204 may comprise one or more non-transitory computer-readable storage mediums that are collectively configured to store (i) program instructions that are executable by the one or more processors 202 such that the computing platform 200 is configured to perform some or all of the disclosed functions and (ii) data that may be received, derived, or otherwise stored, for example, in one or more databases, file systems, or the like, by the computing platform 200 in connection with the disclosed functions. In this respect, the one or more non-transitory computer-readable storage mediums of the data storage 204 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that the data storage 204 may comprise computer-readable storage mediums that are distributed across a plurality of physical computing resources connected via a network, such as a storage cluster of a public, private, or hybrid cloud. Data storage 204 may take other forms and/or store data in other manners as well.

The one or more communication interfaces 206 may be configured to facilitate wireless and/or wired communication with external data sources and/or end-user devices, such as the end-user devices 112 in FIG. 1. Additionally, in an implementation where the computing platform 200 comprises a plurality of physical computing resources connected via a network, the one or more communication interfaces 206 may be configured to facilitate wireless and/or wired communication between those physical computing resources (e.g., between computing and storage clusters in a cloud network). As such, the one or more communication interfaces 206 may take any suitable form for carrying out these functions, examples of which may include an Ethernet interface, a serial bus interface (e.g., Firewire, USB 3.0, etc.), a chipset and antenna adapted to facilitate wireless communication and/or any other interface that provides for wireless communication (e.g., Wi-Fi communication, cellular communication, short-range wireless protocols, etc.)

and/or wired communication, among other possibilities. The one or more communication interfaces 206 may also include multiple communication interfaces of different types. Other configurations are possible as well.

Although not shown, the computing platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the computing platform 200.

It should be understood that the computing platform 200 is one example of a computing platform that may be used with the embodiments described herein. Numerous other arrangements are possible and contemplated herein. For instance, other computing platforms may include additional components not pictured and/or more or less of the pictured components.

Figure 3:
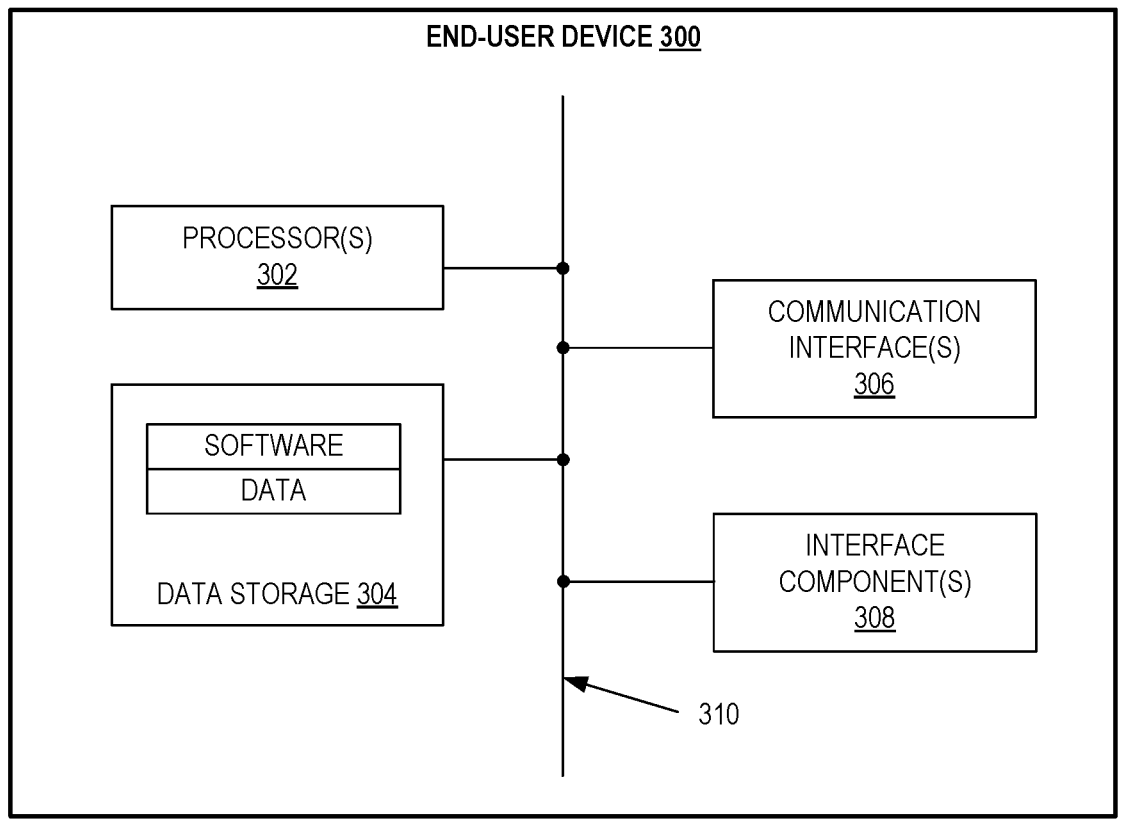
FIG. 3 depicts a structural diagram of an example end-user device that may be configured to communicate with the example computing platform of FIG. 2 and also carry out one or more functions in accordance with the disclosed technology.

Turning now to FIG. 3, a simplified block diagram is provided to illustrate some structural components that may be included in an example end-user device 300, such as an end-user device 112 described above with reference to FIG. 1. As shown in FIG. 3, the end-user device 300 may include one or more processors 302, data storage 304, one or more communication interfaces 306, and one or more user-interface components 308, all of which may be communicatively linked by a communication link 310 that may take the form of a system bus or some other connection mechanism. Each of these components may take various forms.

The one or more processors 302 may comprise one or more processing components, such as general-purpose processors (e.g., a single- or a multi-core CPU), special-purpose processors (e.g., a GPU, application-specific integrated circuit, or digital-signal processor), programmable logic devices (e.g., a field programmable gate array), controllers (e.g., microcontrollers), and/or any other processor components now known or later developed.

In turn, the data storage 304 may comprise one or more non-transitory computer-readable storage mediums that are collectively configured to store (i) program instructions that are executable by the processor(s) 302 such that the end-user device 300 is configured to perform certain functions related to interacting with and accessing services provided by a computing platform, such as the example computing platform 200 described above with reference to FIG. 2, and (ii) data that may be received, derived, or otherwise stored, for example, in one or more databases, file systems, repositories, or the like, by the end-user device 300, related to interacting with and accessing the services provided by the computing platform. In this respect, the one or more non-transitory computer-readable storage mediums of the data storage 304 may take various forms, examples of which may include volatile storage mediums such as random-access memory, registers, cache, etc., and non-volatile storage mediums such as read-only memory, a hard-disk drive, a solid-state drive, flash memory, an optical-storage device etc. The data storage 304 may take other forms and/or store data in other manners as well.

The one or more communication interfaces 306 may be configured to facilitate wireless and/or wired communication with other computing devices. The one or more communication interfaces 306 may take any of various forms, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Other configurations are possible as well.

The end-user device 300 may additionally include or have interfaces for one or more user-interface components 308 that facilitate user interaction with the end-user device 300, such as a keyboard, a mouse, a trackpad, a display screen, a touch-sensitive interface, a stylus, a virtual-reality headset, and/or one or more speaker components, among other possibilities.

It should be understood that the end-user device 300 is one example of an end-user device that may be used to interact with a computing platform as described herein. Numerous other arrangements are possible and contemplated herein. For instance, in other embodiments, the end-user device 300 may include additional components not pictured and/or more or fewer of the pictured components.

III. EXAMPLE FUNCTIONALITY

It should be understood that the end-user device 300 is one example of an end-user device that may be used to interact with a computing platform as described herein. Numerous other arrangements are possible and contemplated herein. For instance, in other embodiments, the end-user device 300 may include additional components not pictured and/or more or fewer of the pictured components.

As described above, Procore Technologies has continued to develop software technology related to determining data connectivity. Disclosed herein is new software technology that is generally directed to identifying location entities within two-dimensional drawings associated with a construction project, determining interrelationships between those location entities, and generating a data taxonomy of those location entities and their interrelationships. The new software technology disclosed herein further involves presenting the hierarchical data structure for user interaction and providing information about location entities and their interrelationships not only with other location entities, but with other two-dimensional drawings and/or the construction project as well.

In one aspect, the disclosed software technology involves utilizing one or more machine learning models (e.g., one or more image segmentation techniques, one or more natural language processing techniques, etc.) to identify, from a set of one or more drawings for a construction project, location entities within the construction project. In this regard, a location entity may refer to a defined area within a construction project that is associated with a particular location, which may or may not be demarcated by physical boundaries. Some examples of location entities that may be demarcated by physical boundaries (e.g., walls, floors, ceilings, etc.) may include buildings, floors within a building, rooms within a floor of a building, hallways, elevators, or staircases, among other possibilities. Some examples of location entities that may not be demarcated by physical boundaries may include laydown areas for temporary storage of construction materials or equipment, or stabilized construction ingress and egress points for a construction site.

In some implementations, the disclosed software technology may involve mapping location entities across more than one location plane. For instance, a given location entity may be associated with a first location on a first location plane (e.g., a project-specific coordinate system) and one or more corresponding locations on one or more additional location planes. Further, in some implementations, certain location entities may be associated with different locations during different phases of a construction project, and in such instances, the disclosed software technology may involve tracking those location entities throughout the lifecycle of the construction project. Further yet, in some implementations, certain location entities may be associated with different names throughout the lifecycle of a construction project, and in such instances, the disclosed software technology may involve tracking that information throughout the lifecycle of the construction project and determining relationships between location entities and location entity names.

In another aspect, the disclosed software technology may involve determining relationships between identified location entities. For instance, certain location entities may have a hierarchical relationship with one or more other location entities, such as a room located within a wing located within a floor of a building. The disclosed software technology may further involve generating a data structure (e.g., a graph, a tree, etc.) that can be used to organize and present information about identified location entities in an intelligent way that visualizes the determined relationships between those location entities. In some implementations, the generated data structure may be interactive such that a construction professional may provide user input to select nodes representing location entities to obtain respective information about those location entities (which may include location plane mapping information as described above) and their hierarchical relationships.

Figure 4:
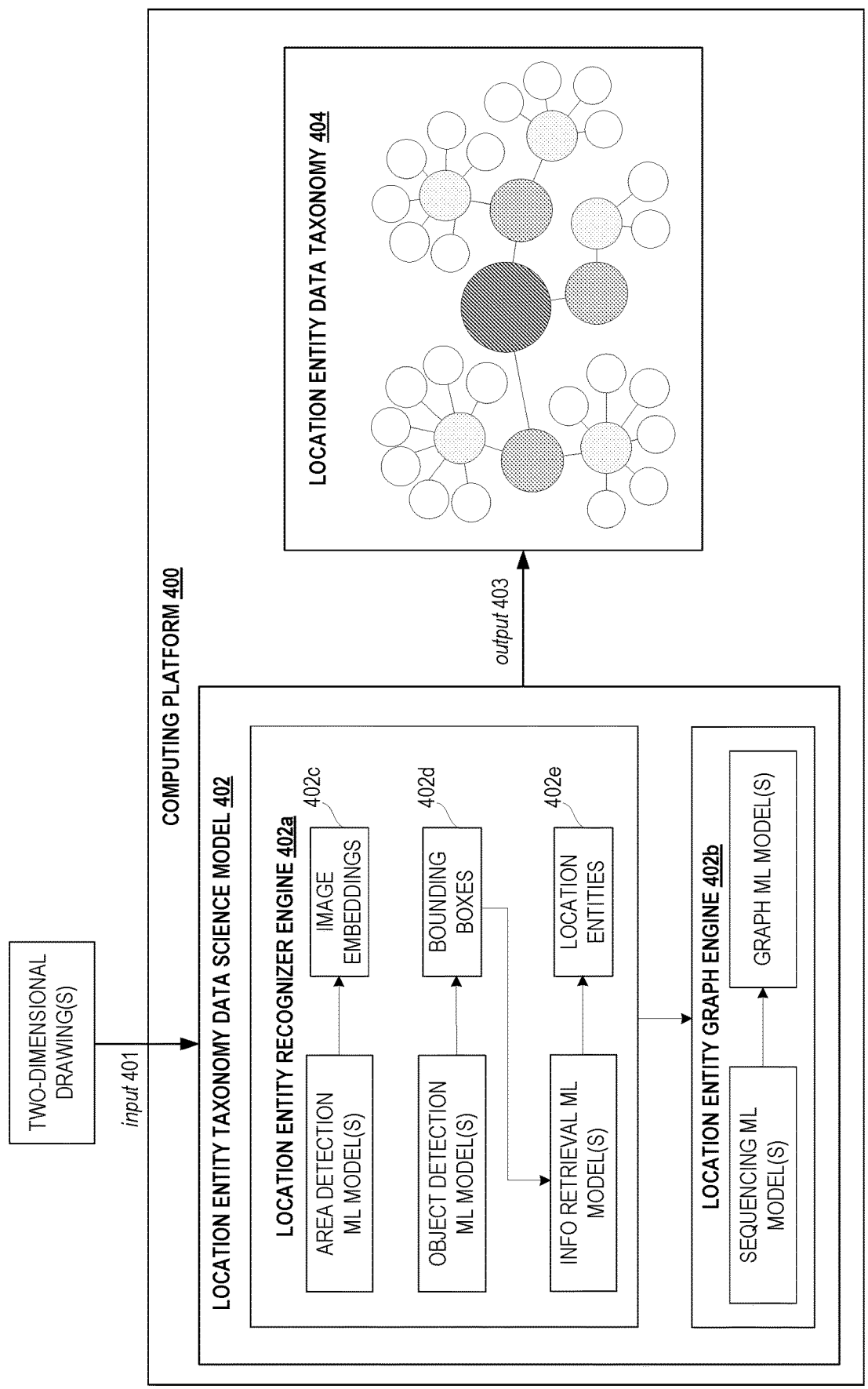
FIG. 4 depicts a simplified block diagram of example data flows that may be utilized by an example computing platform for identifying location entities and generating a location entity hierarchy data structure that represents identified location entities and their interrelationships according to one possible implementation of the disclosed technology.

Turning now to FIG. 4, a schematic diagram of an example computing platform 400 that is configured to perform the functions disclosed herein is shown. The computing platform 400 may be similar to the back-end computing platform 102 discussed above with reference to FIG. 1 and/or the example computing platform 200 discussed above with reference to FIG. 2. The computing platform 400 includes a location entity taxonomy data science model 402 that may function to (i) receive, as input 401, a set of one or more two-dimensional ("2D") drawings for a construction project, (ii) identify location entities within the 2D drawing(s), (iii) determine interrelationships between the identified location entities, and (iv) generate a location entity data taxonomy 404 that organizes and visualizes the identified location entities and their interrelationships.

As shown in FIG. 4, the location entity taxonomy data science model 402 may comprise a location entity recognizer engine 402a and a location entity graph engine 402b. The location entity recognizer engine 402a may function to utilize one or more location entity detector machine-learning models to perform image analysis and information retrieval for the inputted 2D drawing(s) and thereby identify location entities present within. In turn, the location entity graph engine 402b may function to utilize one or more machine-learning models to obtain graph data for information output by the location entity recognizer engine 402a and then generate the location entity data taxonomy 404 as an output 403. The operations of the location entity taxonomy data science model 402 and the data flows depicted in FIG. 4 will now be described in more detail with reference to FIG. 5.

Figure 5:
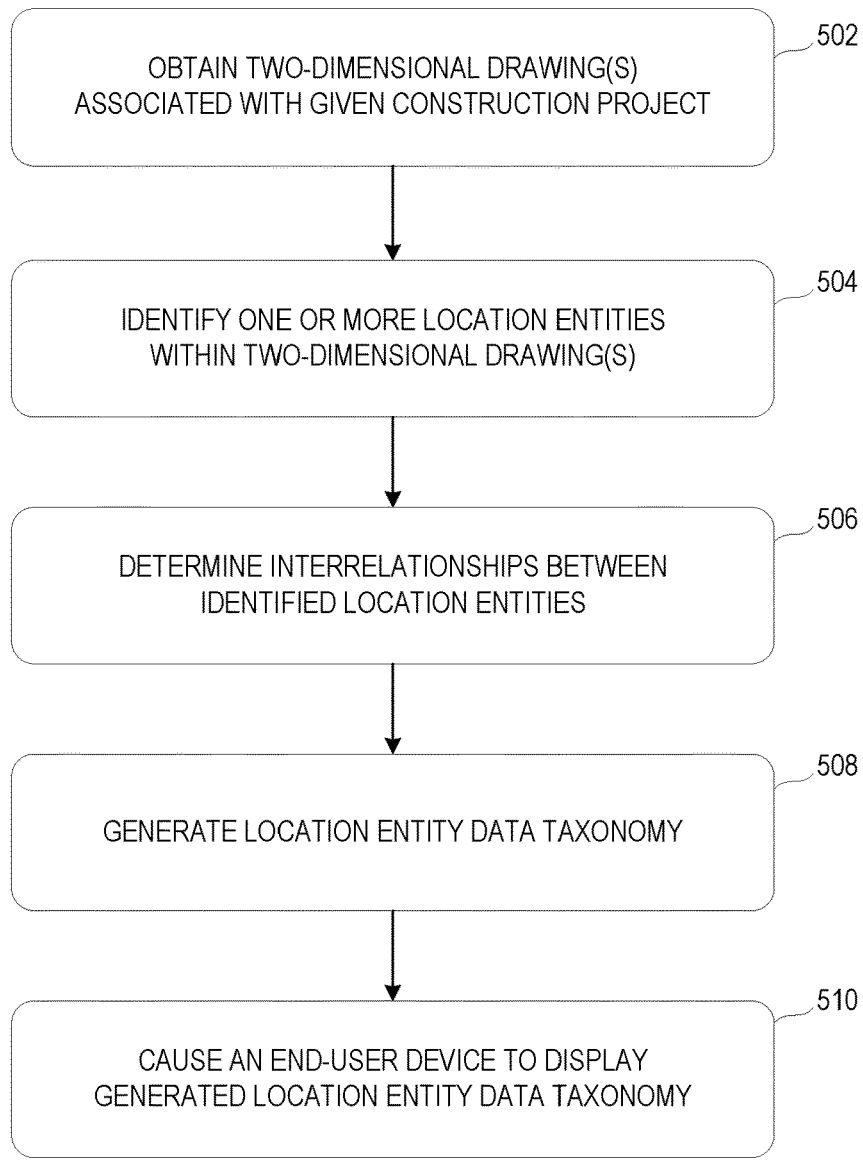
FIG. 5 depicts a flow diagram of an example process for generating a hierarchical data structure that represents identified location entities and their interrelationships according to one possible implementation of the disclosed technology.

FIG. 5 depicts a flow diagram of an example process 500 that includes operations that may be carried out to facilitate generating a data taxonomy of location entities associated with a construction project and the interrelationships between those location entities. As mentioned above, the example process 500 may be carried out by a back-end computing platform that is configured to run the disclosed software technology, such as the computing platform 400 shown in FIG. 4.

The example process 500 may include one or more operations, functions, or actions as illustrated by one or more of blocks 502-510. Although blocks 502-510 are illustrated in sequential order, these blocks may also be performed in parallel, and/or in a different order than those described herein. Also, the various blocks may be combined into fewer blocks, divided into additional blocks, and/or removed based upon the desired implementation.

In addition, for the example process 500, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the example process 500, each block shown in FIG. 5 may represent circuitry that is wired to perform the specific logical functions in the process.

The example process 500 may begin at block 502, where the computing platform 400 may obtain one or more 2D construction drawings associated with a given construction project. More particularly, the 2D construction drawings may be obtained by the location entity recognizer engine 402a of the location entity taxonomy data science model 402. Construction drawings may take various forms and may include various types of information that serve to guide construction professionals during the construction process. As one example, construction drawings may comprise architectural drawings that include design information about the construction project, such as site plans, floor plans, reflected ceiling plans, and/or building elevations, among other possibilities. As another example, construction drawings may comprise structural drawings that depict structural details and instructions for building the construction project. As yet another example, construction drawings may comprise mechanical, electrical, and plumbing (MEP) drawings that depict information related to the respective mechanical, electrical, and plumbing systems for the construction project. Other examples of 2D drawings that are obtained by the computing platform 400 as the input 401 are also possible.

Figure 6:
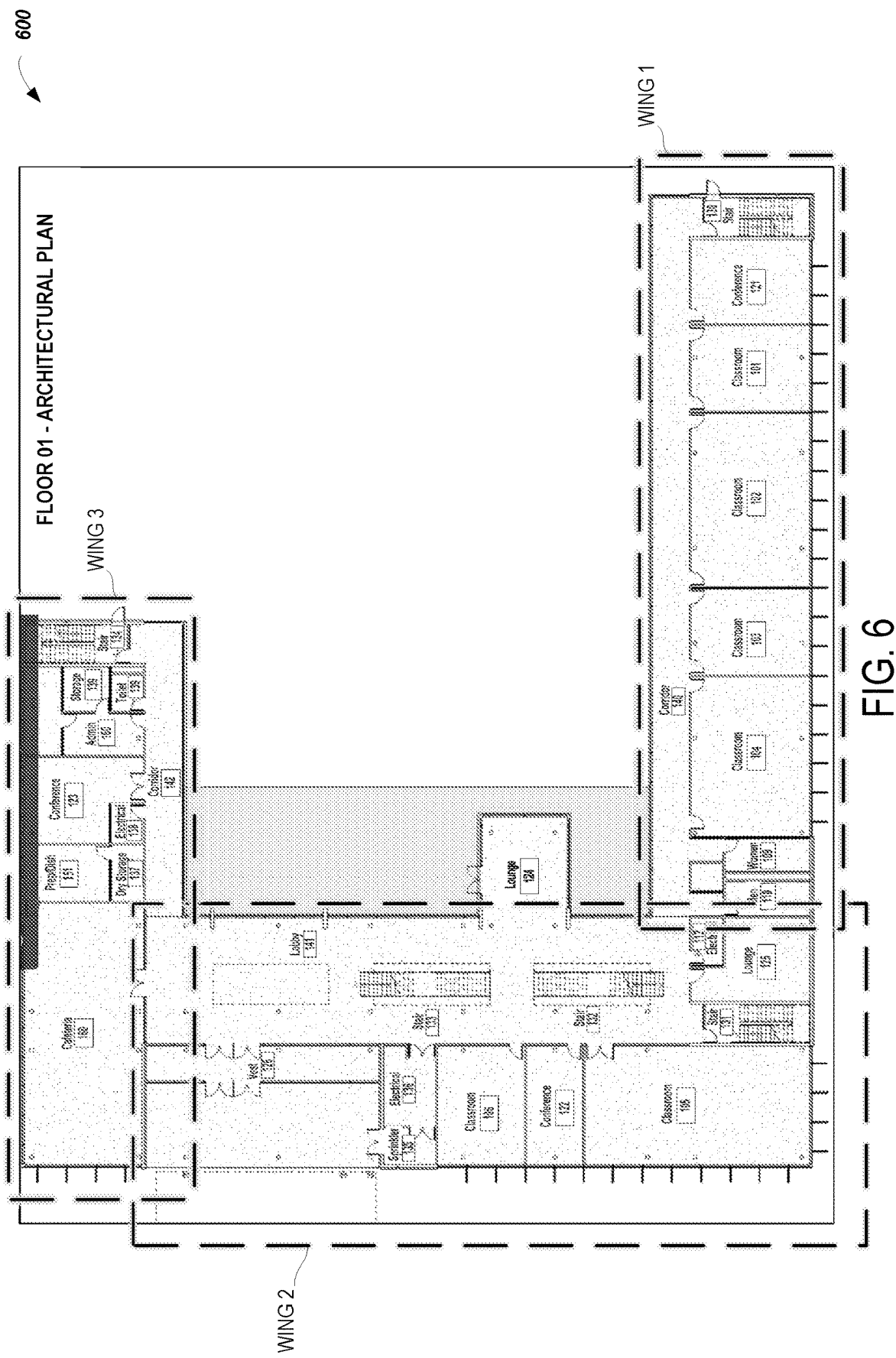
FIG. 6 depicts an example two-dimensional drawing associated with a construction project that may be provided as input for the example process of FIG. 4.

Turning briefly to FIG. 6, an example 2D drawing 600 is shown. As shown in FIG. 6 the example drawing 600 may be an architectural drawing comprising a portion of a floor plan for a first floor of a building of a given construction project. The portion of the floor plan depicted in the 2D drawing 600 may have a first wing (i.e., Wing 1), a second wing (i.e., Wing 2), and a third wing (i.e., Wing 3). As will be appreciated by a review of FIG. 6, although the 2D drawing 600 comprises architectural design information about rooms in the first, second, and third wings of the first floor, and even conveys visually where those location entities are located and how they may be related to each other, the 2D drawing 600 nonetheless does not represent any of that information within a data structure that can be used as a basis for organizing project information based on location entities. Moreover, the 2D drawing 600 does not provide any information explaining how those location entities may be related to other location entities present in other drawings, or other information associated with the given construction project.

Returning to FIG. 5, the function of obtaining the one or more 2D drawings may take various forms. As one possibility, obtaining the 2D drawing(s) may comprise retrieving an electronic version of each 2D drawing from one or more data stores accessible to the computing platform 400. As another possibility, obtaining the 2D drawing(s) may comprise importing an electronic version of each 2D drawing from an external source, such as a third-party computing platform. In practice, the electronic version of each 2D drawing that is obtained may be formatted as a 2D image file. In this regard, the 2D image file corresponding to each 2D drawing may be a raster image (e.g., a raster Portable Document Format (PDF) file, etc.) that is composed by an arrangement of individual pixels and thus susceptible to loss of fidelity when manipulated. Therefore, obtaining the 2D drawing(s) may further comprise converting the raster image file of each 2D drawing to a vector image file (e.g., a vector PDF, a vector Portable Network Graphics (PNG) file, etc.) that is composed by a set of instructions that detail the arrangement of points, lines, and curves in the 2D image.

The computing platform 400 may obtain the one or more 2D drawings at various times. As one possibility, the computing platform 400 may obtain the 2D drawing(s) upon detecting that new 2D drawings are accessible to the computing platform 400. For instance, in an implementation where the electronic version of the 2D drawing comprises obtaining the 2D drawing from a data store accessible to the computing platform 400, the electronic version may have been provided to the computing platform 400 during an intake process whereby a construction professional (e.g., an architect, an engineer, etc.) associated with the given construction project may have accessed the computing platform 400 via an end-user device (such as an end-user device 112 of FIG. 1 or the end-user device 300 of FIG. 3) and uploaded the electronic version to be stored in the data store accessible to the computing platform 400. In such instances, the computing platform 400 may detect that one or more new 2D drawings are available and may accordingly obtain those 2D drawings and thereby initiate the example process 500. As another possibility, the computing platform 400 may obtain the 2D drawing(s) in response to receiving data indicating a user request to access a location entity data taxonomy for the given construction project. Other examples are also possible.

At block 504, for each 2D drawing that was obtained at block 502, the computing platform 400 may detect one or more location entities within the drawing. The function of detecting one or more location entities may take various forms and may generally involve performing a layout analysis of the 2D drawing and retrieving additional information about the 2D drawing to supplement the layout analysis.

The function of performing the layout analysis may take various forms. In the examples that follow, the layout analysis is described as being carried out by the location entity recognizer engine 402*a*, but it should be understood that the layout analysis may be performed by one or more other software engines of the computing platform 400. In general, the layout analysis may comprise an area detection phase and an object detection phase.

During the area detection phase, the location entity recognizer engine 402*a* may utilize one or more image processing techniques to automatically detect areas (e.g., rooms) within the 2D drawing, and then fuse the outputs of the different techniques to arrive at a merged set of area polygons for the 2D drawing. The different image processing techniques that are utilized by the computing platform 400 in this regard may take various forms, each of which may be applied to each obtained 2D construction drawing for which a layout analysis is to be performed.

For instance, as one possibility, the computing platform 400 may apply one or more image segmentation techniques that are implemented using machine-learning models that utilize convolutional neural networks (CNNs). As one possible image segmentation technique, the computing platform 400 may apply one or more semantic segmentation models (e.g., ResNet, DeepLab, etc.) whereby each pixel in the 2D image is assigned a class label (e.g., room, wall, etc.). Thereafter, one or more post-processing steps may be applied to subdivide the overall set of commonly-classified pixels into individual areas (e.g., individual rooms). Each individual area identified in this way may be represented by a respective 2D polygon, which in turn be associated with a corresponding confidence score that represents the confidence level (e.g., a number between 0 and 1) associated with the detection of the particular individual area. The computing platform 400 may apply semantic segmentation in other manners as well.

As another possible image segmentation technique, the computing platform 400 may apply one or more instance segmentation models (e.g., MaskRCNN, etc.) whereby the pixels in the 2D image are segregated into separate regions based on the boundaries between areas in the 2D image, without regard to any particular class label. As with semantic segmentation, the output of an instance segmentation model may be a set of 2D polygons, each with an associated confidence score that again represents the confidence level associated with the detection of the particular area by the model. The computing platform 400 may apply instance segmentation in other manners as well.

Further, other image segmentation techniques that are based on one or more machine-learning models are also possible. These may be referred to as supervised image processing models, as the machine-learning models on which they are based rely on training datasets that include labeled (e.g., human-labeled) 2D images of construction drawings.

As another possibility of applying image processing techniques, the computing platform 400 may apply image processing techniques that do not rely on machine-learning models for their operation. These types of techniques, which are also referred to herein as unsupervised image processing models, may instead apply rules-based algorithms that look for certain features and/or characteristics within the 2D image. For example, pixels within the 2D image that are adjacent to each other and similarly-colored (e.g., black or white), within defined tolerances, may be added as part of the same area. Other unsupervised techniques may also be used to search for particular features in a 2D image, such as doors or windows, which are generally expected to be included in association with rooms. As with the supervised models discussed above, the output of the unsupervised image processing techniques may be a set of 2D polygons representing the detected areas in the 2D image. Unlike the supervised models, however, the unsupervised image processing techniques might not yield a confidence score that is associated with each detected polygon. Accordingly, a predetermined confidence score for unsupervised image processing may be assigned (e.g., 0.80, 1.0, etc.). The predetermined confidence score may be determined via testing the effectiveness of the unsupervised techniques, among other possibilities.

Various other types of unsupervised image processing techniques are also possible.

It will be appreciated that an image processing technique such as any of the techniques discussed above, if implemented in isolation, might not be reliable as a generalized solution for detecting areas across all types of construction drawings, which may include a wide range of scenarios and design layouts as previously mentioned. Accordingly, the computing platform 400 may perform a layout analysis for a given 2D image using two or more different image processing techniques and then fuse the results of the different techniques together to produce a merged output that is more accurate and reliable than any of the individual techniques would be alone.

The function of fusing outputs from the different image processing techniques may take various forms. As one possibility, fusing the outputs from the different image processing techniques may comprising running a fusion engine that receives the output from each of the techniques discussed above, which may include a respective set of 2D polygons, with each polygon in each set having an associated confidence score, and then measuring the degree or overlap, or coverage, between each polygon in each set with each other polygon in the other sets. In this way, the various polygons from each set may be assigned to polygon groups based on their degree of overlap.

The fusion engine may then determine a combined confidence score for each polygon group based on the polygon(s) in the group and their respective confidence scores. Based on a confidence threshold value, the fusion engine may output a final polygon that is reported as a detected area within the 2D drawing file. In some cases, the polygon in the group with the highest individual confidence score may be reported as the final polygon. Alternatively, the fusion engine may synthesize a final polygon based on the member polygons of the group. Other possibilities also exist.

When the analysis is complete, the fusion engine may output a set of final polygons that comprise the output 402c in the form of image embeddings that represent the discrete areas detected within the 2D image file. More information about automatically detecting areas within 2D image files can be found in U.S. Pat. No. 11,410,362, issued on Aug. 9, 2022, and titled "Automatic Area Detection," which is herein incorporated by reference in its entirety.

During the object detection phase of the layout analysis, the location entity recognizer engine 402a may utilize one or more object detection techniques and thereby produce a respective bounding box identifying a location of each discrete area detected within the 2D drawing (e.g., each room, each hallway, each stairway, etc.). For example, as one possibility, the location entity recognizer engine 402a may utilize an object detection algorithm that is implemented using one or more machine-learning models that utilize a CNN, such as a You Only Look Once (YOLO) algorithm that analyzes the 2D drawing and outputs bounding boxes and respective classification labels for each discrete area within the 2D drawing. In practice, the one or more machine-learning models may be trained using manually labeled 2D drawings from previous construction projects. The location entity recognizer engine 402a may additionally or alternatively use one or more other object detection techniques to produce the output 402d, which may comprise any object detection technique now known or later developed. The bounding box and respective classification label that is produced for each location entity in the 2D drawing may collectively form the bounding boxes output data 402d.

The layout analysis may take other forms as well.

After performing the layout analysis, the location entity recognizer engine 402a may utilize one or more information extraction techniques to retrieve additional information that may indicate that one or more of the areas detected during the layout analysis comprise defined location entities. The information extraction techniques utilized by the location entity recognizer engine 402a may take various forms. For instance, as one example, the location entity recognizer engine 402a may apply Optical Character Recognition (OCR) techniques to recognize text within the 2D drawing that may indicate a location entity.

As another example, the location entity recognizer engine 402a may apply one or more natural language processing (NLP) techniques to recognize words, phrases, labels, dimensioning information, or other semantic information that may indicate a location entity. For example, the location entity recognizer engine 402a may determine that text and/or words such as "women," "stair," "lobby," and "cafe" are indicative of location entities comprising a restroom, a stairway, a lobby, and a cafeteria, respectively. Conversely, the location entity recognizer engine 402a may determine that text comprising dates on which drawings were created or names of construction professionals (e.g., a name of an architect who prepared the 2D drawing) are not indicative of location entities and may discard that information from the additional information that is retrieved.

In some instances, the location entity recognizer engine 402a may extract more than one word that is determined to be associated with a given location entity.

The function of retrieving additional information as described above may be based in part on the bounding boxes data that is outputted during the object detection phase of the layout analysis. For instance, the location entity recognizer engine 402a may use a given location entity's bounding box as a reference to determine what OCR and/or NLP-extracted information is associated with that given location entity.

The location entity recognizer engine 402a may extract additional information in other ways as well.

To illustrate with a real-world example, reconsider the example 2D drawing 600 shown in FIG. 6. After performing a layout analysis of the 2D drawing 600, the location entity recognizer engine 402a may apply one or more OCR and/or NLP techniques to retrieve additional information about the areas identified during the layout analysis and thereby identify location entities within the 2D drawing. For example, the location entity recognizer engine 402a may determine that the 2D drawing 600 comprises a portion of an architectural plan for a first floor of a given construction project that depicts a first, second, and third wing. Further, the location entity recognizer engine 402a may determine that Wing 1 comprises nine discrete areas that were identified during the layout analysis, and based on extracting information about those identified areas (e.g., extracting the labels "Stair 130," "Conference 121," "Classroom 101," "Classroom 102," "Classroom 103," "Classroom 104," "Corridor 140," "Women 109," "Men 110," etc.), may further determine that each of those nine discrete areas corresponds to a given location entity within the 2D drawing

600. In a similar way, the location entity recognizer engine 402a may identify location identities corresponding to the second and third wings shown in the example drawing 600.

The location entities that are identified by the location entity recognizer engine 402a may collectively form the location entities output 402e. Each location entity may comprise a respective location entity identifier, a respective bounding box and classification label (e.g., based on the layout analysis), and a list of one or more associated words (e.g., based on the information retrieval).

After the layout analysis and information retrieval is complete, each of the output data 402c, 402d, and 402e may in turn be used as inputs for the location entity graph engine 402b that functions to determine the interrelationships between the location entities. For instance, at block 506, the location entity graph engine 402b may determine the interrelationships between the location entities that were identified by the location entity recognizer engine 402a. The function of determining the interrelationships between the identified location entities may take various forms.

As one possibility, the function of determining the interrelationships between the identified location entities may involve deriving graph data based on the output data 402c, 402d, and 402e, which may then be used data to generate a location entity data taxonomy that includes the identified location entities and their determined interrelationships. The graph data that is derived may take the form of vector embeddings that represent various characteristics of the identified location entities. The vector embeddings may take various forms.

As one possibility, the vector embeddings may take the form of image embeddings that represent areas within the 2D drawing that are indicative of location entities. For instance, in one implementation, the image embeddings 402c that are output by the location entity recognizer engine 402a may be the image embeddings that are derived by the location entity graph engine 402b. However, it is possible that the location entity graph engine 402b may derive the image embeddings in other ways as well. As another possibility, the vector embeddings may take the form of text embeddings that represent one or more words associated with a given location entity. The location entity graph engine 402b may derive such text embeddings based on the location entities data outputted by the location entity recognizer engine 402a. For instance, the location entity graph engine 402b may utilize one or more machine-learning models to convert string sequences for the identified location entities (e.g., the lists of one or more words) into text embeddings that represent the string sequences as vectors. As another possibility, the vector embeddings may take the form of position embeddings that represent each location entity's position within the 2D drawing (e.g., its sequence relative to other location entities within the 2D drawing). The location entity graph engine 402b may derive such position embeddings based on one or more of the image embeddings 402c, bounding boxes 402d, or location entities 402e that were outputted by the location entity recognizer engine 402a. For instance, the location entity graph engine 402b may utilize one or more machine-learning models that evaluate the data for the one or more of the image embeddings 402c, bounding boxes 402d, and determine position embeddings for each identified location entity that represent the location entity's position within the 2D drawing and its order (e.g., sequence) relative to other location entities in the 2D drawings.

The derived vector embeddings for the identified location entities may then serve as the graph data that is used to determine relationships for the identified location entities. The function of determining relationships for the identified location entities may take various forms. In one implementation, the function of determining relationships for the identified location entities may involve providing the derived vector embeddings as input to a set of one or more machine-learning models that have been trained, using labeled graph data, to analyze the various characteristics of the identified location entities that are represented by the vector embeddings and thereby determine relationships for the identified location entities, which may include interrelationships between the location entities, relationships between location entities and the 2D drawing (e.g., pixel locations within the 2D drawing), and relationships between location entities and other data associated with the construction project (e.g., GPS coordinates, gridlines, etc.). The set of one or more machine-learning models that are configured to determine relationships for the identified location entities may take various forms. For example, as one possibility, the one or more machine-learning models may take the form of a graph neural network or an ensemble of graph neural networks that are configured to receive the graph data as input, analyze the graph data, and output a set of predicted relationships for the identified location entities based on analyzing the graph data.

The function of determining the relationships for the identified location entities may take other forms as well.

Figure 7:
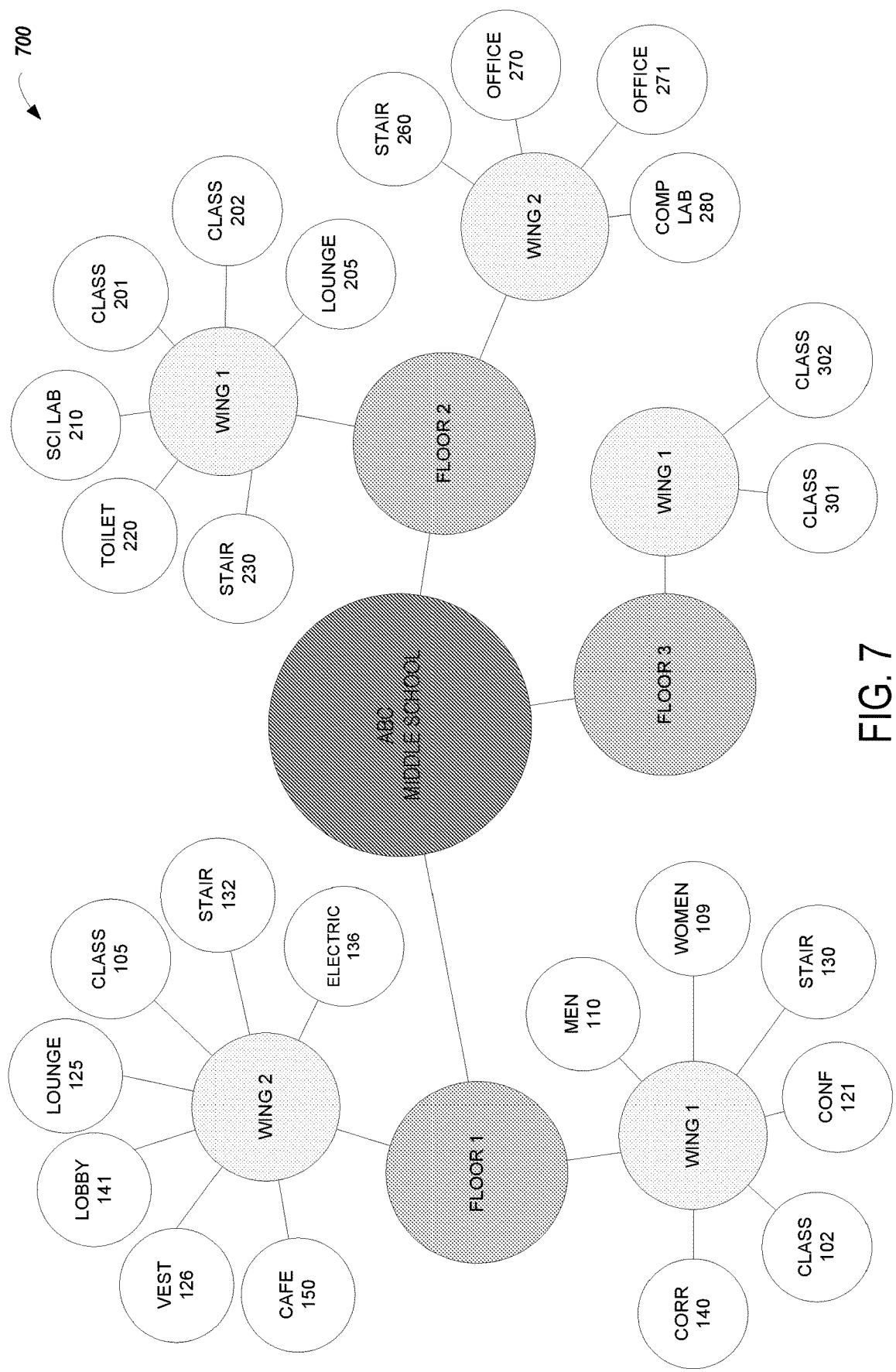
FIG. 7 depicts a portion of an example location entity hierarchy data structure that represents location entities associated with a given construction project and their interrelationships according to one possible implementation of the disclosed technology.

After determining the relationships for the identified location entities, at block 508, the location entity graph engine 402b may generate a location entity data taxonomy that comprises a hierarchical data structure classifying the identified location entities based on similar characteristics, where each location entity is represented as a discrete node of the data structure, and each relationship between any two given location entities is represented by a discrete edge of the data structure. To illustrate with an example, FIG. 7 depicts a portion of an example location hierarchy data taxonomy 700 that may be generated by the computing platform 400 using the disclosed software technology in line with the discussion above. The example data taxonomy 700 may have been generated by the computing platform 400 after receiving and processing a set of input drawings that include the example drawing 600 of FIG. 6. As shown in FIG. 7, the example data taxonomy depicts a hierarchical structure comprising various location entity nodes. The example data taxonomy may include classification information for each node that identifies what type of location entity the node represents (e.g., a floor, a classroom, a lounge, a stairway, etc.). Further, each node may have a visual representation that corresponds to a given hierarchy level and indicates how the nodes are hierarchically related. For example, as shown, nodes belonging to a first hierarchy level may be represented by a first size (e.g., building-level nodes), nodes belonging to a second hierarchy level may be represented by a second size (e.g., floor-level nodes), nodes belonging to a third hierarchy level may be represented by a third size (e.g., wing-level nodes), nodes belonging to a fourth hierarchy level may be represented by a fourth size (e.g., room-level nodes), and so forth. Optionally, nodes of different hierarchy levels may additionally be represented by a given color (e.g., purple, orange, blue, green, etc.). Further, interrelationships between nodes may be represented by edges (e.g., lines) between those nodes and may provide further information about the hierarchical structure between the nodes.

As mentioned above, the location entity data taxonomy that is generated in accordance with the software technology disclosed herein enables the hierarchical structure of location entities and their interrelationships to be organized and visualized for a user (e.g., a construction professional) in an intelligent and intuitive way that enables user interaction and improves user accessibility and usability of taxonomy data. For instance, after generating the data taxonomy in line with the discussion above, at block 510, the computing platform 400 may cause an end-user device (e.g., an end-user device 112 or the end-user device 300) to display the location entity data taxonomy 700. In practice, the computing platform 400 may cause the end-user device to display the location entity data taxonomy in response to receiving, from the end-user device, data indicating a request to view the location entity data taxonomy. For example, a construction professional may have accessed a software application that incorporates the disclosed software technology via the end-user device (e.g., tablet, laptop, etc.) that is configured to communicate with the computing platform 400 and navigated to a user interface view for requesting to view the location entity data taxonomy 700. In turn, the computing platform 400 may cause the end-user device to display a user interface view that includes a visualization of the location entity data taxonomy, which may include the portion shown in FIG. 7.

Advantageously, at an instant glance, the data taxonomy 700 that is generated from a set of one or more 2D drawings visually provides, within a single data structure, a significantly greater amount and complexity of information about location entities associated with the given construction project and their relationships that would otherwise require referencing various different sources of information. For example, the portion of the data taxonomy 700 shown in FIG. 7 may readily convey that the data taxonomy 700 relates to a middle school building that comprises at least three floors, with each floor having at least one wing, and each wing having at least two rooms. In comparison, returning briefly to the 2D drawing 600 shown in FIG. 6, only a limited amount of information can be obtained from viewing the 2D drawing 600 itself. While some of the interrelationships between spaces depicted in FIG. 6 can be observed and understood by a construction professional who views the 2D drawing 600 (e.g., rooms are located within a wing, within the first floor of the building), simply viewing the 2D drawing 600 does not reduce this information to a data structure that can be used to organize location entities as discussed herein. Moreover, the 2D drawing 600 contains no information about the relationships between the spaces depicted in the 2D drawing 600 and other 2D drawings, how the 2D drawing 600 relates to other 2D drawings of the given construction project, or any other contextual information about how the 2D drawing 600 is associated with the given construction project. For instance, if a construction professional wishes to obtain more information about a location entity corresponding to the classroom 102, the construction professional would need to access and reference other documents containing that information, perhaps after searching for the documents. Even then, the construction professional may find it difficult to obtain the types of insights and contextual data for the classroom 102 that may be accessible via the location entity data taxonomy 700.

Returning to FIG. 7, the data taxonomy 700 may be embodied in an interactive form such that a construction professional may provide user input to obtain insights and additional information for given nodes. For instance, following the example above wherein the construction professional may wish to obtain additional information about the classroom 102, the construction professional may provide a user input via the user interface displayed at the end-user device to select of the respective node corresponding to the classroom 102, which may be depicted as "CLASS 102" in the taxonomy 700. The user input may take any of various forms, including a mouse click, a keyboard input, or a touch screen input, among other possibilities. In turn, the computing platform 400 may receive, from the end-user device, data defining an indication of the selected node, and may then cause the end-user device to display a user interface view that provides insights and/or additional information about the selected node.

Figure 8:
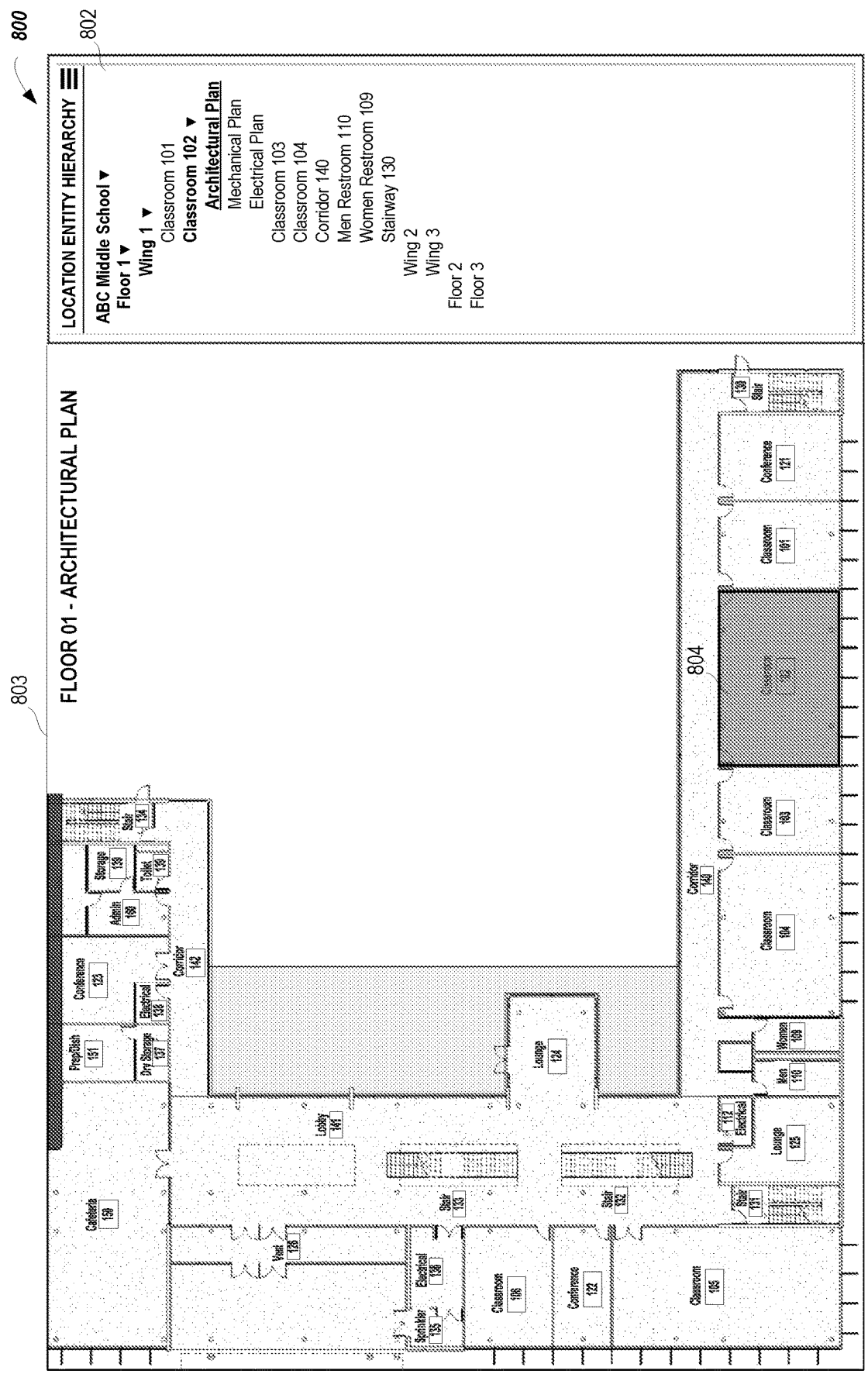
FIG. 8 depicts an example user interface view including a two-dimensional drawing associated with a construction project and a location entity hierarchy pane that may be presented to a user to obtain information about identified location entities and their interrelationships.

FIG. 8 depicts one example view 800 of such a user interface view that may be displayed at an end-user device after the construction professional has interacted with the location entity data taxonomy to select the respective node for the location entity depicted as classroom 102 in FIG. 6. Alternatively, view 800 may be displayed when a construction professional who is viewing the two-dimensional drawing 600 shown in FIG. 6 selects the location corresponding to the classroom 102, among other possibilities. In either case, the view 800 may include a drawing pane 803 that displays a 2D drawing that includes the location entity represented by the selected node, along with a visual indicator 804 that indicates the selected location entity within the 2D drawing. For instance, as shown in FIG. 8, the drawing pane 803 depicts a 2D drawing that includes the classroom 102 location entity, which may be the 2D drawing 600 of FIG. 6, and the visual indicator 804 indicating the construction professional's selection of the classroom 102 location entity. Although the visual indicator 804 shown in FIG. 8 takes the form of a highlighted indicator overlaid on the classroom 102 location entity, it should be understood that the visual indicator 804 may take other forms as well.

The view 800 may further include a location entity hierarchy pane 802 that includes textual representations of the hierarchy structure represented by the location entity data taxonomy 700. For instance, the hierarchy pane 802 includes selectable representations of location entities that comprise other nodes of the data taxonomy 700. As shown in FIG. 8, the selectable representations may be displayed as nested lists that correspond to the hierarchy of nodes in the data taxonomy 700. For example, a first level of one or more selectable representations (e.g., "ABC Middle School") corresponds to a first hierarchy of nodes (e.g., building-level nodes) depicted in the data taxonomy 700, a second level of selectable representations (e.g., "Floor 1," "Floor 2," "Floor 3") corresponds to a second hierarchy of nodes (e.g., floor-level nodes), a third level of selectable representations (e.g., "Wing 1," "Wing 2," "Wing 3") corresponds to a third hierarchy of nodes (e.g., wing-level nodes), and a fourth level of selectable representations (e.g., "Classroom 101," "Classroom 102," "Classroom 103," etc.) corresponds to a fourth hierarchy of nodes (e.g., room-level nodes). The selectable representations may take other forms as well. The location hierarchy pane 802 further includes respective visual indicators indicating each currently-expanded list of selectable representations. As shown in FIG. 8, these visual indicators may take the form of bolded text accompanied by a "down arrow" icon indicating that the particular level is currently selected, although the visual indicators may take other forms as well.

The hierarchy pane 802 may further include additional information related to the selected classroom 102 location entity. As one possibility, the hierarchy pane 802 may include mapping information for the selected location entity with respect to one or more different location planes. Such mapping information may take various forms. For instance, as one example, such mapping information may include information that maps a given location entity across one or more 2D drawings associated with a given construction project, including information about a given 2D drawing that is currently displayed in the location hierarchy pane 802. For instance, the hierarchy pane 802 may include a nested list under "Classroom 102" that displays respective selectable representations of construction drawings that include the classroom 102 location entity. As shown, a visual indicator that takes the form of a bolded, underlined representation "Architectural Plan" may indicate that the 2D drawing currently displayed in the view 800 is an architectural drawing. The nested list may further include selectable representations of other 2D drawings associated with the given construction project that also include the selected classroom 102 location entity. For example, the hierarchy pane 802 indicates that the classroom 102 location entity is also included in mechanical drawings associated with the given construction project and electrical drawings associated with the given construction project. The respective representations for each of the mechanical drawings and the electrical drawings may be selectable to cause the drawing pane 803 to update the displayed 2D drawing to show the selected drawing, rather than the architectural drawing.

As another example, the mapping information may include information that maps a given location entity across one or more location planes associated with a construction project. As mentioned above, a given construction project may have respective locations that are associated with different location planes, such as a project-specific coordinate system (e.g., gridlines), a pixel-based coordinate system, a 3D-model based coordinate system, or a GPS coordinate system, among other possibilities. Such mapping information may be obtained by the computing platform 400 in various ways. For example, as one possibility, such mapping information may be determined by the computing platform 400 as part of performing one or more functions associated with the process of obtaining 2D drawings and generating a location entity data taxonomy as disclosed herein. As another possibility, the computing platform 400 may obtain the mapping information from one or more data stores accessible to the computing platform 400. The mapping information may be obtained in other ways as well.

To illustrate with an example, a given location entity within a construction project may be associated with (i) pixel-based location information that indicates a respective location of each discrete set of pixels representing the given location entity in each 2D drawing associated with the construction project, (ii) GPS-based location information that represents a latitude and longitude of the location entity, and (iii) 3D model-based location information that comprises (x, y, z) coordinates associated with the location entity in a 3D drawing file associated with the construction project. Although not shown in FIG. 8, each of these locations may be included as mapping information that is displayed in the view 800 when a given location entity is selected. The mapping information may be interactive such that a construction professional may input a selection of given mapping information to obtain details about that mapping information. Further, in some implementations, the view 800 may be updated to include source information from which the selected mapping information originates. For example, upon the construction professional's selection of a representation of pixel-based location information, the view 800 may be updated to include each 2D drawing (e.g., architectural drawings, electrical drawings, mechanical drawings, etc.) to which the given location entity is mapped. As another example, upon the construction professional's selection of a representation of GPS-based location information, the view 800 may be updated to display GPS information related to the given location entity within the construction project. Other examples are also possible.

As another possibility, the additional information that may be included in the hierarchy pane 802 may comprise location tracking information for a selected location entity's location over the course of the construction project. For instance, certain location entities associated with a construction project may be transient in nature and may be associated with different locations within the construction project during different phases of the construction project. To illustrate with an example, based on analyzing 2D drawings associated with a construction project in line with the discussion above, the computing platform 400 may determine that a laydown area (e.g., an area that has been designated for storing construction equipment and materials) is located at a first location during a first phase of the construction project, a second location during a second phase of the construction project, and a third location during a third phase of the construction project. Such information may then be included in the view 800, thereby enabling a construction professional to interact with the location hierarchy pane 802 to view the location tracking information for the given location entity throughout different stages of the construction project. Without the location hierarchy pane 802, the construction professional might otherwise be forced to search through the construction drawings to find where the laydown area is located from phase to phase.

As yet another possibility, the additional information that may be included in the hierarchy pane 802 may comprise entity name tracking information for one or more names associated with a selected location entity throughout the course of the construction project. For instance, certain location entities of a construction project may be associated with different names during different phases (and perhaps even across different location planes) of the construction project. For example, names of certain location entities may change in instances where designs for those location entities is amended and/or where construction for those location entities becomes actualized.

To illustrate with an example, the computing platform 400 may determine that a given location entity may be associated with (i) a first name "G4-H5" corresponding to a discrete area bounded by given construction project gridlines as of a first date and/or phase of the construction project (e.g., planning phase), (ii) a second name "Level 01 Lobby" corresponding to a discrete area indicated in a first set of one or more 2D drawings as of a second date and/or phase of the construction project (e.g., design phase), and (iii) a third name "Level 01 Lobby—Reception" corresponding to a discrete area indicated in a second set of one or more 2D drawings as of a third date and/or phase of the construction project (e.g., construction phase). The computing platform 400 may include in the location hierarchy pane 802 an interactive (e.g., selectable, filterable, etc.) representation for each respective name associated with the given location entity that facilitates obtaining details about that respective name. Such details may additionally include information about one or more other location entities that may also be associated with a given respective name. For instance, in the example above, the given location entity may be a reception area in a first level lobby of a given building of a given construction project. The name tracking information for the reception area may include the three names as described above, and selecting the second name "Level 01 Lobby" may cause the computing platform 400 to update the location hierarchy pane 802 to include information about not only the reception area location entity, but also other location entities that are located within the area designated as "Level 01 Lobby," such as a given restroom location entity, a given cafe location entity, a given hallway location entity, and/or a given elevator bank location entity. In this way, the computing platform 400 may track name changes of location entities throughout construction project lifecycles and include such information in the location entity data taxonomy. Other examples are also possible.

The additional information may take other forms as well.

In some implementations, the location entity data taxonomy information that is presented to a construction professional via a user interface view, such as the example view 800, may be filtered based on one or more characteristics of the construction professional. Advantageously, filtering the information in this way may increase the relevance of the location entity information that is presented to the construction professional. For example, as one possibility, the taxonomy information may be filtered based on user profile information associated with the construction professional, such as the type of work the construction professional typically performs. For instance, if the construction professional is an electrical engineer, the displayed information may be filtered to show location entity information related to electrical drawings by default. As another possibility, the taxonomy information may be filtered based on location information associated with the construction professional, such as location information indicating a site location where the construction professional is scheduled to perform work, or information indicating a current location within the construction project where the computing platform 400 determines the construction professional is located (e.g., based on receiving location information from an end-user device associated with the construction professional), among other possibilities. For instance, if the computing platform 400 determines that the construction professional is located on a given floor of a given building associated with a given construction project, the computing platform 400 may cause the taxonomy information that is presented to the construction professional to be filtered to show location entity information for the given floor of the given building.

As yet another possibility, the taxonomy information may be filtered based on a combination of one or more characteristics, including any of the characteristics described above. For instance, as one example, the taxonomy information may be filtered based on one or more of determined (i) embedded location information identifying a given location of the construction project obtained by the computing platform 400 (e.g., pre-defined location information embedded in a Quick Response (QR) code scanned by an end-user device being operated by the user, etc.) and/or (ii) user location information (e.g., GPS and/or sensor information associated with an end-user device being operated by the user, etc.). In this regard, sensor data associated with an end-user device being operated by the user may be normalized based on crowd-sourced sensor data (e.g., barometer data, gyroscope data, magnetometer data, etc.) associated with other end-user devices being operated by other users, which in the aggregate may indicate location biases that may be exhibited by certain models of end-user device and/or certain locations within a construction site. Further discussion of accounting for sensor biases in the location of end-user devices within a construction project can be found in U.S. application Ser. No. 17/895,556, filed on Aug. 25, 2022 and entitled "Verification of Progression of Construction-Related Activity at a Given Location," which is incorporated herein by reference in its entirety.

The taxonomy information may be filtered in other ways as well.

Further, in some implementations, the example view 800 may also include one or more options that enable the construction professional to obtain analytics information related to the generated location entity data taxonomy. For instance, the construction professional may wish to obtain a report of information related to a given location entity or a given portion of the location entity data taxonomy. The example view 800 may include one or more options for inputting a request for the computing platform 400 to return the desired analytics information. Other examples are also possible.

In the ways described above, the disclosed software technology provides several improvements and advantages over existing technology for determining relationships between information for construction projects. As one example, the disclosed software technology enables information about location entities associated with construction projects, information about interrelationships between those location entities, and information about relationships between the location entities and the construction projects to be organized and stored within one data structure. As another example, the disclosed technology enables that information to be visualized in an intelligent way in a manner that increases user accessibility and interaction with that information.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," or other entities, this is for purposes of example and explanation only. Claims should not be construed as requiring action by such actors unless explicitly recited in claim language.

The invention claimed is:

1. A computing platform comprising:
at least one network interface;
at least one processor;
at least one non-transitory computer-readable medium; and
program instructions stored on the at least one non-transitory computer-readable medium that are executable by the at least one processor such that the computing platform is configured to:
    obtain a two-dimensional drawing of a portion of a construction project;
    perform an image processing analysis of the two-dimensional drawing to identify one or more location entities within the two-dimensional drawing;
    derive embeddings for each location entity in the two-dimensional drawing;
    based on the derived embeddings, determine relationships between the one or more location entities;
    based on the determined relationships between the one or more location entities, generate a location entity data taxonomy that includes each identified location entity as a respective node that is related to at least one other location entity;

cause an end-user device to display a visualization of the location entity data taxonomy; and cause the end-user device to filter the displayed visualization based on information about a given user associated with the end-user device, wherein the program instructions that are executable by the at least one processor such that the computing platform is configured to generate the location entity data taxonomy comprise program instructions that are executable by the at least one processor such that the computing platform is configured to:

apply one or more machine-learning models that are configured to receive the derived embeddings as input and output the location entity data taxonomy.

2. The computing platform of claim 1, wherein the program instructions that are executable by the at least one processor such that the computing platform is configured to obtain the two-dimensional drawing comprise program instructions that are executable by the at least one processor such that the computing platform is configured to:

obtain a first image file of the two-dimensional drawing that is composed of pixels; and convert the first image file to a second image file of the two-dimensional drawing that is composed of instructions for arranging points, lines, and curves in the two-dimensional drawing.

3. The computing platform of claim 1, wherein the image processing analysis comprises utilizing one or more image processing techniques and thereby detecting at least one area representative of a location entity.

4. The computing platform of claim 1, wherein the image processing analysis comprises extracting information indicative of a location entity utilizing one or both of (i) optical character recognition or (ii) one or more natural language processing techniques.

5. The computing platform of claim 1, wherein the image processing analysis comprises detecting discrete areas within the two-dimensional drawing.

6. The computing platform of claim 1, wherein the derived embeddings comprise one or more of (i) position embedding data that indicates a relative position of a respective location entity within the two-dimensional drawing, (ii) image embedding data that indicates a region of interest where the respective location entity is located within the two-dimensional drawing, or (iii) text embedding data that represents one or more string sequences associated with the respective location entity.

7. The computing platform of claim 1, further comprising program instructions that are executable by the at least one processor such that the computing platform is configured to:

receive, from the end-user device, data indicating a selection of a given node of the location entity data taxonomy; and after receiving the data indicating the selection, cause the end-user device to display taxonomy information for the given node.

8. At least one non-transitory computer-readable medium, wherein the at least one non-transitory computer-readable medium is provisioned with program instructions that, when executed by at least one processor, cause a computing platform to:

obtain a two-dimensional drawing of a portion of a construction project;

perform an image processing analysis of the two-dimensional drawing to identify one or more location entities within the two-dimensional drawing;

derive embeddings for each location entity in the two-dimensional drawing;

based on the derived embeddings, determine relationships between the one or more location entities;

based on the determined relationships between the one or more location entities, generate a location entity data taxonomy that includes each identified location entity as a respective node that is related to at least one other location entity;

cause an end-user device to display a visualization of the location entity data taxonomy; and cause the end-user device to filter the displayed visualization based on information about a given user associated with the end-user device, wherein the program instructions that are executable by the at least one processor such that the computing platform is configured to generate the location entity data taxonomy comprise program instructions that are executable by the at least one processor such that the computing platform is configured to:

apply one or more machine-learning models that are configured to receive the derived embeddings as input and output the location entity data taxonomy.

9. The at least one non-transitory computer-readable medium of claim 8, wherein the image processing analysis comprises utilizing one or more image processing techniques and thereby detecting at least one area representative of a location entity.

10. The at least one non-transitory computer-readable medium of claim 8, wherein the image processing analysis comprises extracting information indicative of a location entity utilizing one or both of (i) optical character recognition or (ii) one or more natural language processing techniques.

11. The at least one non-transitory computer-readable medium of claim 8, wherein the image processing analysis comprises detecting discrete areas within the two-dimensional drawing.

12. The at least one non-transitory computer-readable medium of claim 8, wherein the derived embeddings comprise one or more of (i) position embedding data that indicates a relative position of a respective location entity within the two-dimensional drawing, (ii) image embedding data that indicates a region of interest where the respective location entity is located within the two-dimensional drawing, or (iii) text embedding data that represents one or more string sequences associated with the respective location entity.

13. The at least one non-transitory computer-readable medium of claim 8, wherein the at least one non-transitory computer-readable medium is also provisioned with program instructions that, when executed by the at least one processor, cause the computing platform to:

receive, from the end-user device, data indicating a selection of a given node of the location entity data taxonomy; and after receiving the data indicating the selection, cause the end-user device to display taxonomy information for the given node.

14. A method carried out by a computing platform, the method comprising:

obtaining a two-dimensional drawing of a portion of a construction project;

performing an image processing analysis of the two-dimensional drawing to identify one or more location entities within the two-dimensional drawing;

deriving embeddings for each location entity in the two-dimensional drawing;

based on the derived embeddings, determining relationships between the one or more location entities; and based on the determined relationships between the one or more location entities, generating a location entity data taxonomy that includes each identified location entity as a respective node that is related to at least one other location entity, wherein generating the location entity data taxonomy comprises applying one or more machine-learning models that are configured to receive the derived embeddings as input and output the location entity data taxonomy;

cause an end-user device to display a visualization of the location entity data taxonomy; and cause the end-user device to filter the displayed visualization based on information about a given user associated with the end-user device.

15. The method of claim 14, wherein obtaining the two-dimensional drawing comprises:

obtaining a first image file of the two-dimensional drawing that is composed of pixels; and converting the first image file to a second image file of the two-dimensional drawing that is composed of instructions for arranging points, lines, and curves in the two-dimensional drawing.

16. The method of claim 14, wherein the image processing analysis comprises utilizing one or more image processing techniques and thereby detecting at least one area representative of a location entity.

17. The method of claim 14, wherein the image processing analysis comprises extracting information indicative of a location entity utilizing one or both of (i) optical character recognition or (ii) one or more natural language processing techniques.

18. The method of claim 14, wherein the image processing analysis comprises detecting discrete areas within the two-dimensional drawing.

19. The method of claim 14, wherein the derived embeddings comprise one or more of (i) position embedding data that indicates a relative position of a respective location entity within the two-dimensional drawing, (ii) image embedding data that indicates a region of interest where the respective location entity is located within the two-dimensional drawing, or (iii) text embedding data that represents one or more string sequences associated with the respective location entity.

20. The method of claim 1, further comprising:

receiving, from the end-user device, data indicating a selection of a given node of the location entity data taxonomy; and after receiving the data indicating the selection, causing the end-user device to display taxonomy information for the given node.

* * * * *